(12) United States Patent
Shirakawa et al.

(10) Patent No.: US 11,275,184 B2
(45) Date of Patent: Mar. 15, 2022

(54) SCINTILLATOR PANEL AND RADIATION DETECTOR

(71) Applicant: HAMAMATSU PHOTONICS K.K., Hamamatsu (JP)

(72) Inventors: Kazuhiro Shirakawa, Hamamatsu (JP); Keisuke Goto, Hamamatsu (JP); Haruki Yamaji, Hamamatsu (JP); Hidenori Jonishi, Hamamatsu (JP); Masashi Hatanaka, Hamamatsu (JP); Jun Sakurai, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 62 days.

(21) Appl. No.: 16/650,723

(22) PCT Filed: Jul. 3, 2018

(86) PCT No.: PCT/JP2018/025240
§ 371 (c)(1),
(2) Date: Mar. 25, 2020

(87) PCT Pub. No.: WO2019/064788
PCT Pub. Date: Apr. 4, 2019

(65) Prior Publication Data
US 2020/0278460 A1    Sep. 3, 2020

(30) Foreign Application Priority Data
Sep. 27, 2017    (JP) .............................. JP2017-186562

(51) Int. Cl.
*G01T 1/20*    (2006.01)
*G01T 1/202*    (2006.01)
*G21K 4/00*    (2006.01)

(52) U.S. Cl.
CPC ............ *G01T 1/20188* (2020.05); *G01T 1/20* (2013.01); *G01T 1/202* (2013.01); *G21K 4/00* (2013.01)

(58) Field of Classification Search
CPC ....... G01T 1/20; G01T 1/20188; G01T 1/202; G21K 4/00
See application file for complete search history.

(56) References Cited

U.S. PATENT DOCUMENTS

2012/0211669 A1    8/2012 Itaya et al.
2012/0288688 A1    11/2012 Kug et al.
(Continued)

FOREIGN PATENT DOCUMENTS

EP    2141708 A1    1/2010
JP    2012-172971 A    9/2012
(Continued)

OTHER PUBLICATIONS

International Preliminary Report on Patentability dated Apr. 9, 2020 for PCT/JP2018/025240.

*Primary Examiner* — Mark R Gaworecki
(74) *Attorney, Agent, or Firm* — Faegre Drinker Biddle & Reath LLP

(57) ABSTRACT

A scintillator panel includes a substrate having a substrate main surface, a substrate rear surface, and a substrate side surface; a scintillator layer having a scintillator rear surface formed of a plurality of columnar crystals, a scintillator main surface, and a scintillator side surface; and a protective film covering the scintillator side surface of the scintillator layer. The substrate side surface partially has a coarsened region. The scintillator side surface has a coarse surface including an uneven structure. The protective film closely adheres to the scintillator side surface such that the coarse surfaces are covered.

15 Claims, 15 Drawing Sheets

(56) References Cited

U.S. PATENT DOCUMENTS

2012/0318990 A1  12/2012  Tsujii et al.
2016/0116606 A1   4/2016  Itaya et al.
2016/0209516 A1   7/2016  Van Arendonk et al.

FOREIGN PATENT DOCUMENTS

| JP | 2013-002887 A | 1/2013 |
| JP | 5194793 B2 | 5/2013 |
| JP | 2016-136094 A | 7/2016 |
| JP | 2019-060761 A | 4/2019 |
| WO | WO-99/066350 A1 | 12/1999 |

Fig.4
(a)
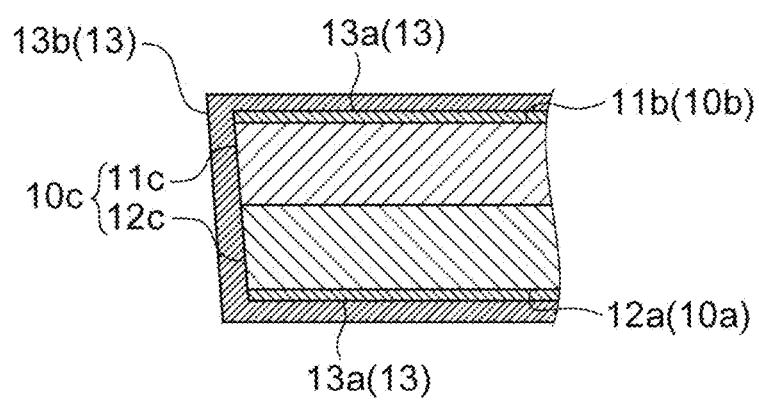
(b)
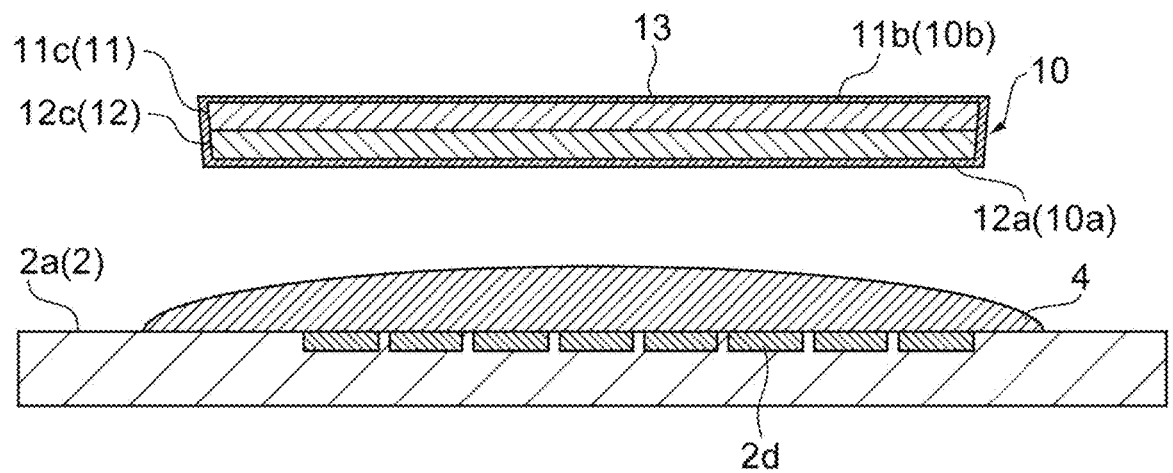
(c)
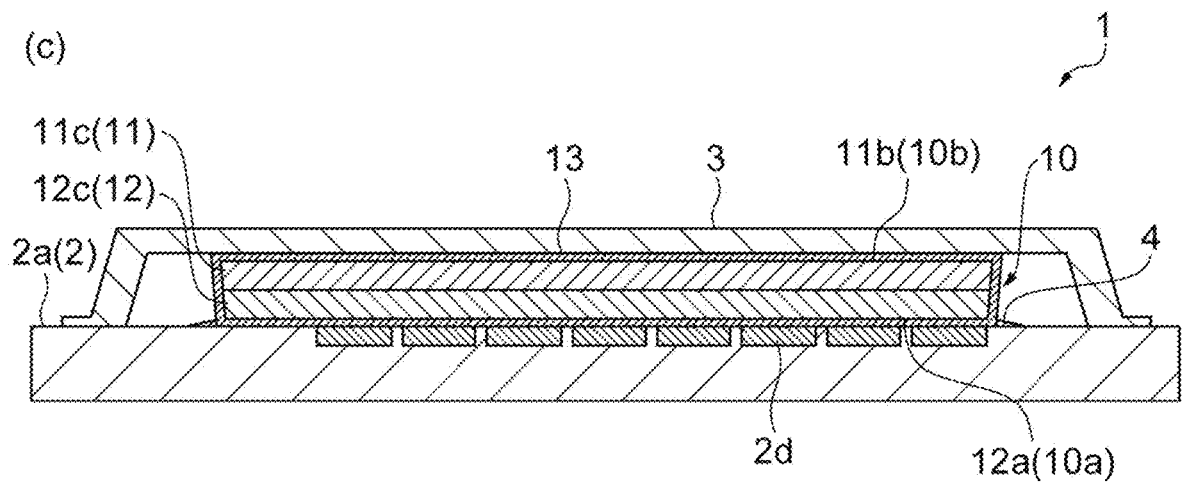

*Fig.9*
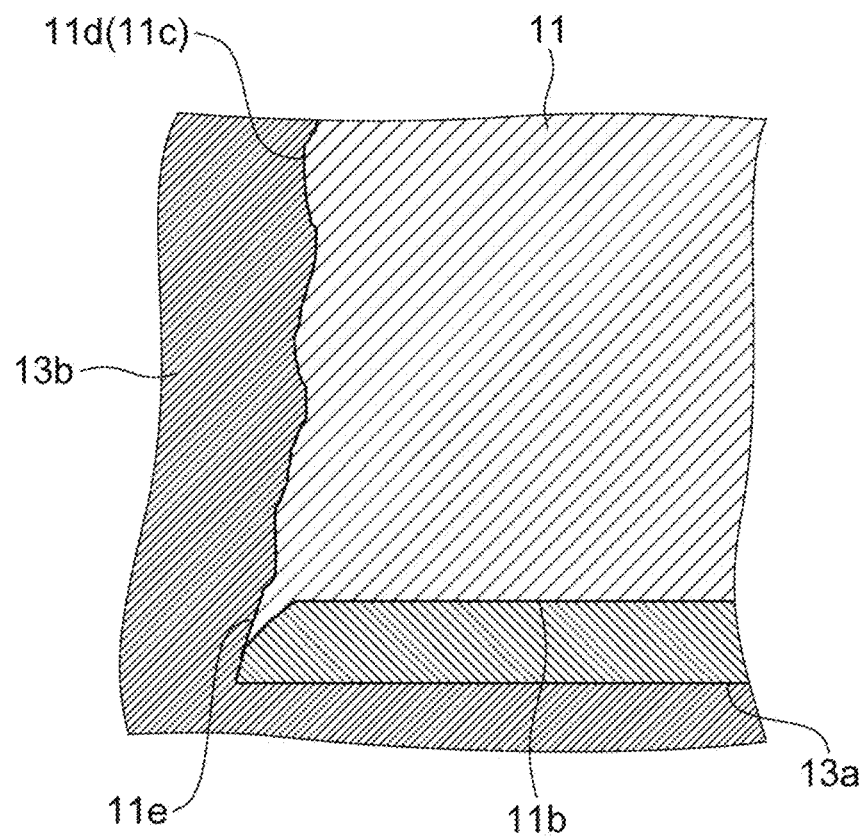
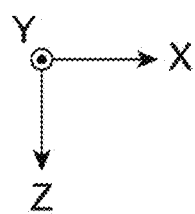

Fig.11
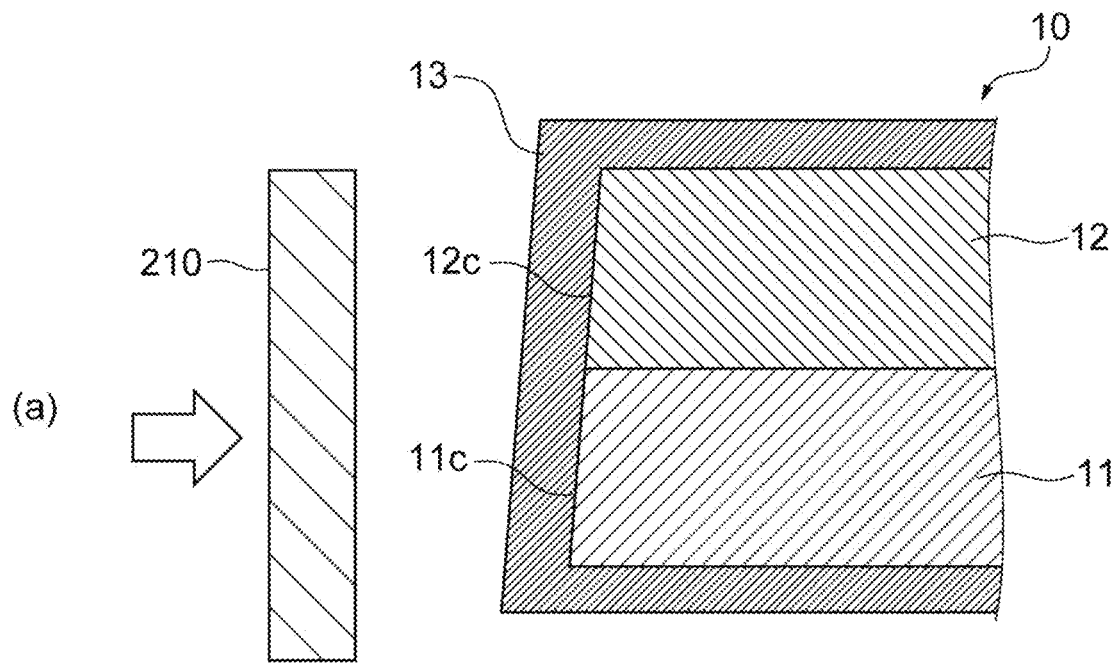
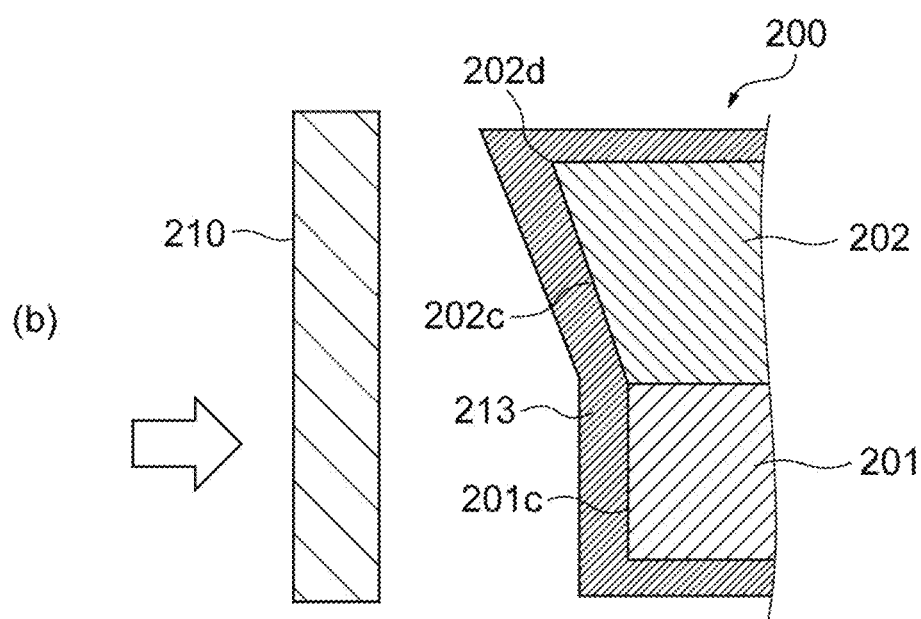

*Fig.12*
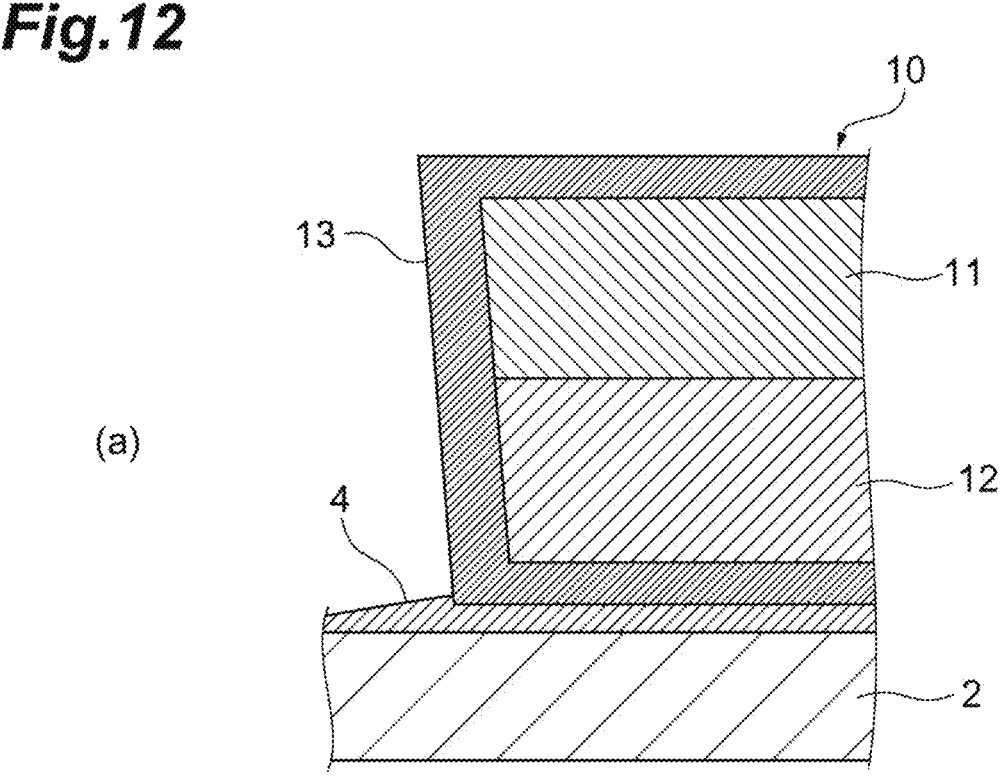
(a)
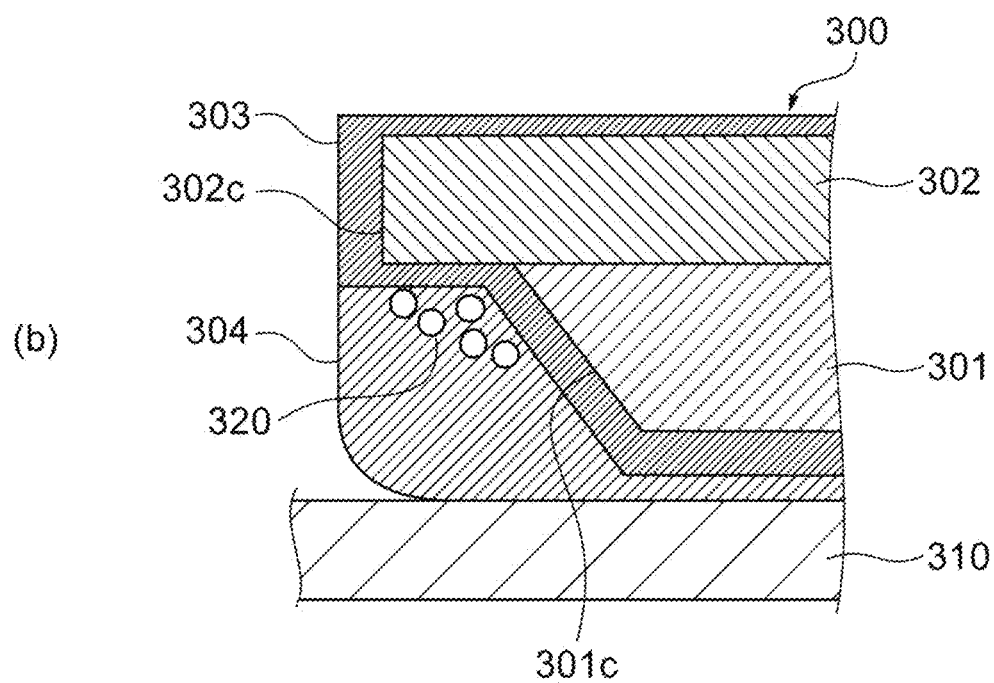
(b)

Fig.13
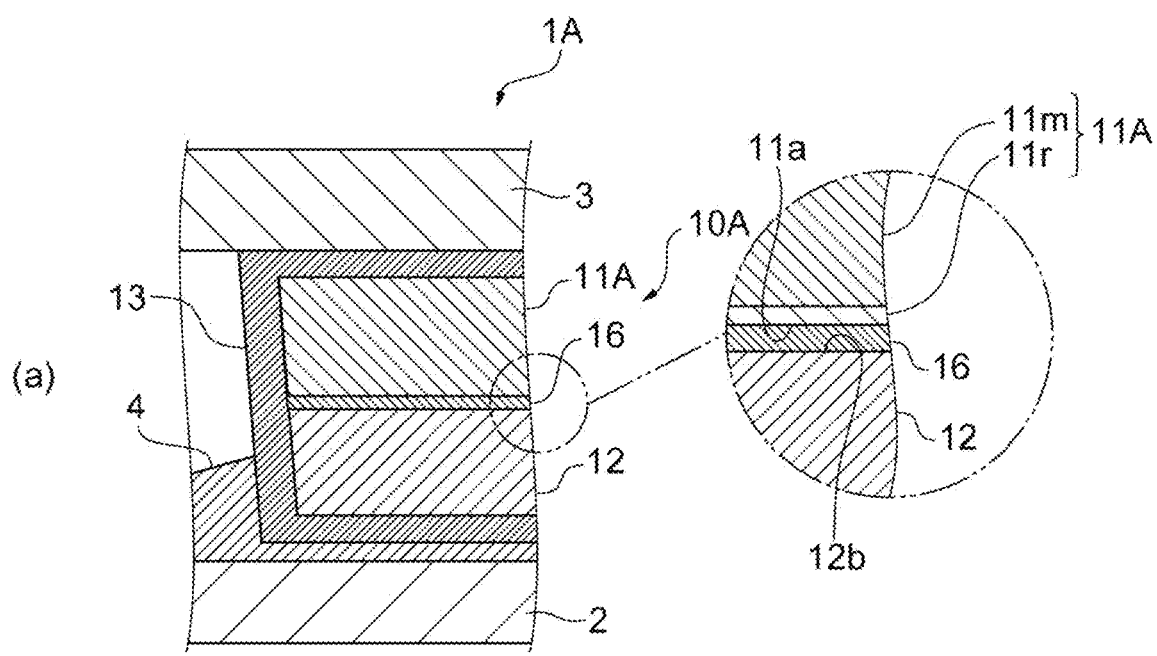
(a)
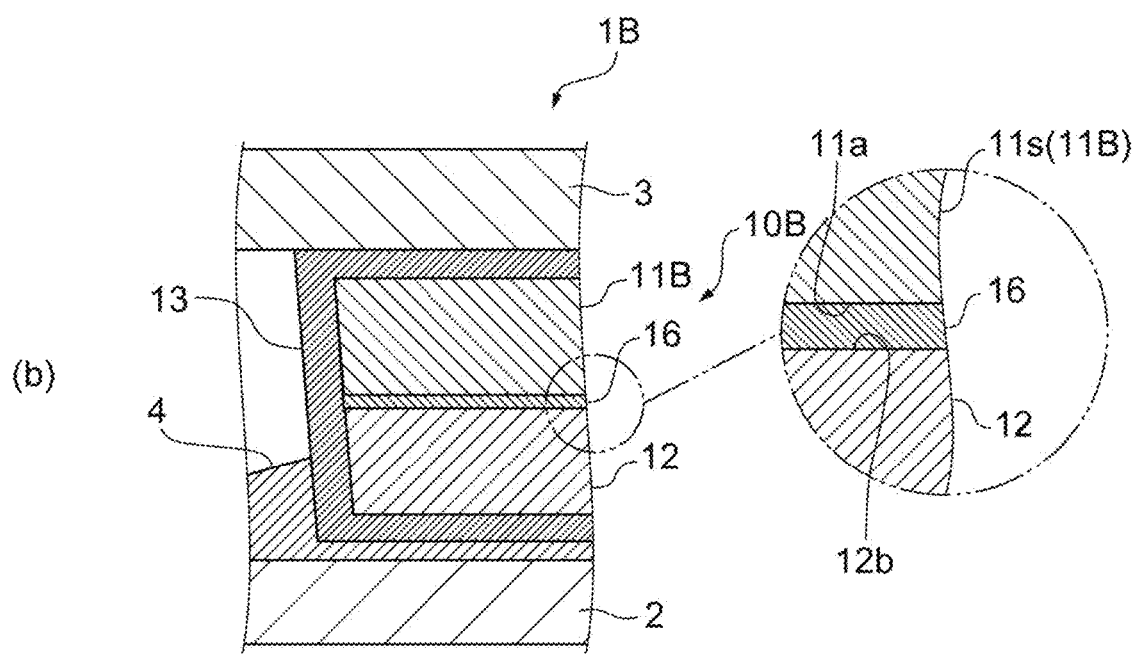
(b)

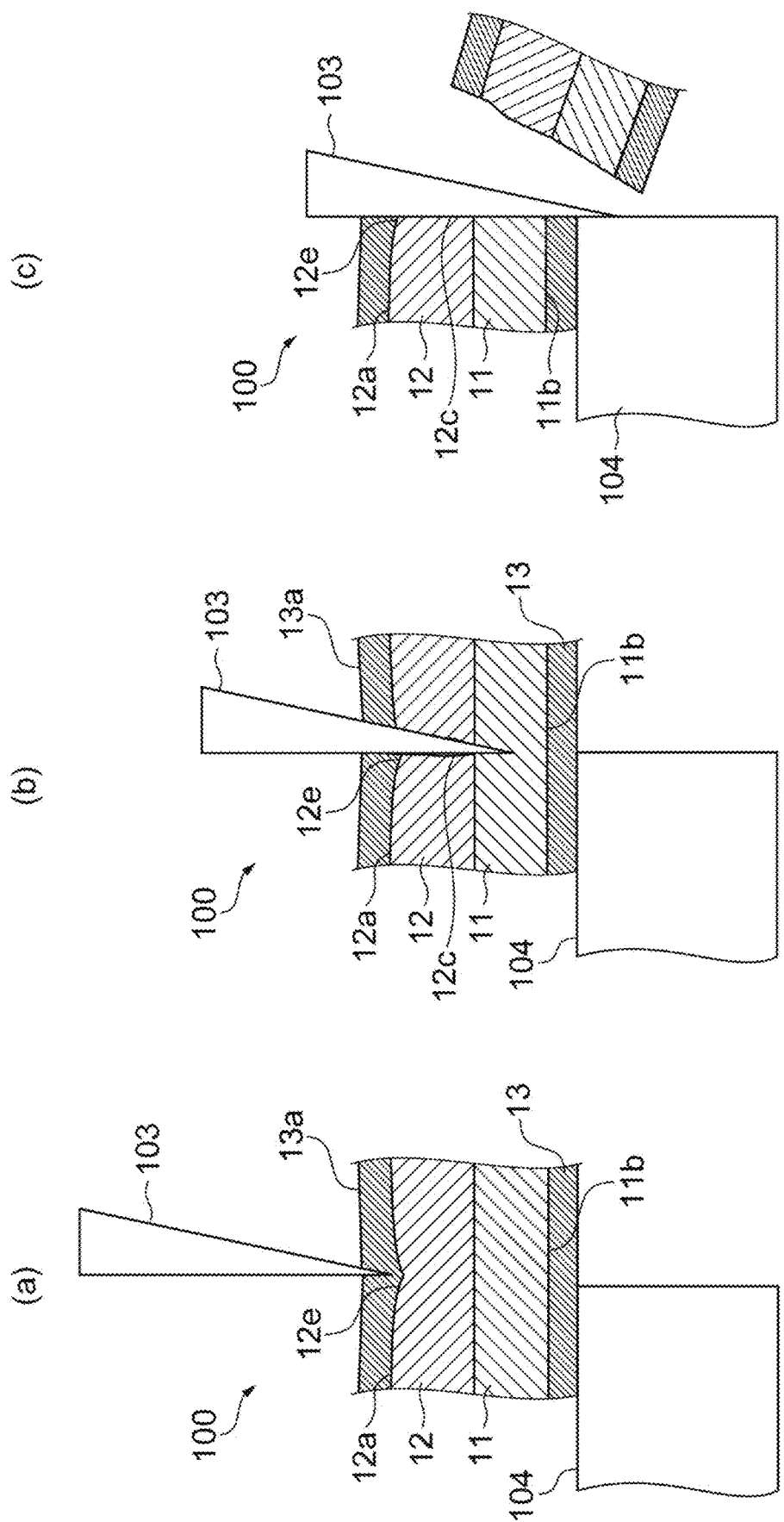

SCINTILLATOR PANEL AND RADIATION DETECTOR

TECHNICAL FIELD

The present invention relates to a scintillator panel and a radiation detector.

BACKGROUND ART

As technologies in this field, Patent Literature 1 is known. Patent Literature 1 discloses a scintillator panel. The scintillator panel has an optical substrate (fiber optical plate: FOP) and a scintillator formed on the optical substrate. A polyparaxylylene film serving as a protective film is formed on each of a side surface of the optical substrate, a side surface of the scintillator, and an upper surface of the scintillator.

CITATION LIST

Patent Literature

Patent Literature 1: PCT International Publication No. WO99/66350

SUMMARY OF INVENTION

Technical Problem

In order to protect a scintillator panel having a substrate and a scintillator layer, a protective film as disclosed in Patent Literature 1 is formed. It is desired that protective films have properties of closely adhering to a substrate and a scintillator layer constituting a scintillator panel such that they do not easily peel off.

Here, an object of the present invention is to provide a scintillator panel in which adhesion of a protective film can be improved and a radiation detector.

Solution to Problem

According to an aspect of the present invention, there is provided a scintillator panel including a substrate portion having a first main surface and a first rear surface intersecting a first direction on sides opposite to each other, and a first side surface extending such that the first main surface and the first rear surface are joined to each other; a scintillator layer portion having a second rear surface formed of a plurality of columnar crystals extending in the first direction and formed to include a base portion being on one end side of the columnar crystals and facing the first main surface, a second main surface formed to include a tip portion on the other end side of the columnar crystals, and a second side surface extending such that the second main surface and the second rear surface are joined to each other; and a protective film covering the first rear surface and the first side surface of the substrate portion, and the second main surface and the second side surface of the scintillator layer portion. The first side surface partially has a coarsened region. The second side surface has a coarsened region including an uneven structure. The protective film closely adheres to the second side surface such that the coarsened regions of the first side surface and the second side surface are covered.

The scintillator panel includes the substrate portion and the scintillator layer portion, and the first side surface of the substrate portion partially has the coarsened region. The second side surface of the scintillator layer portion has the coarsened region including an uneven structure. According to these coarsened regions, the contact area between the substrate portion and the protective film, and the contact area between the scintillator layer portion and the protective film increase. Adhesion of the protective film is enhanced in accordance with increase in contact area. Accordingly, in the scintillator panel, it is possible to improve adhesion of the protective film.

In the aspect, the uneven structure included in the coarsened region may be formed when the columnar crystals become partially deficient. The second side surface having such a constitution can be obtained by cutting a laminated structure having the scintillator layer portion and the substrate portion. Accordingly, it is possible to easily form a coarsened region including an uneven structure.

In the aspect, the first side surface may include a burr formed in a corner portion between the first rear surface and the first side surface. According to this constitution, the contact area between the substrate portion and the protective film increases. Accordingly, in the scintillator panel, it is possible to improve adhesion between the substrate portion and the protective film.

In the aspect, the scintillator layer may have a notch portion formed in a corner portion between the second rear surface and the second side surface. The notch portion may be filled with the protective film. According to this constitution, the contact area between the scintillator layer portion and the protective film further increases. Furthermore, the contact area between the substrate portion and the protective film further increases as well. Accordingly, in the scintillator panel, it is possible to further improve adhesion with respect to the protective film.

In the aspect, the scintillator layer may have an undercut portion formed in a corner portion between the second main surface and the second side surface. The undercut portion may be filled with the protective film. According to this constitution, the contact area between the scintillator layer portion and the protective film still further increases. Accordingly, in the scintillator panel, it is possible to still further improve adhesion with respect to the protective film.

In the aspect, the second rear surface of the scintillator layer portion may come into contact with the first main surface of the substrate portion. According to this constitution, it is possible to directly form the scintillator layer portion on the substrate portion.

In the aspect, the scintillator panel may further include a barrier layer formed to come into contact with each of the first main surface in the substrate portion and the second rear surface in the scintillator layer portion. The barrier layer may be formed of thallium iodide. The scintillator layer may be made of a material having cesium iodide as a main component. The barrier layer constituted of thallium iodide is resistant to moisture. Accordingly, when the barrier layer is provided between the substrate portion and the scintillator layer portion, moisture percolating from the substrate portion side is blocked by the barrier layer. As a result, moisture reaching the scintillator layer portion is curbed. Accordingly, it is possible to protect the base portion of the columnar crystals constituting the scintillator layer portion having deliquescent cesium iodide as the main component.

According to another aspect of the present invention, there is a radiation detector including the scintillator panel emitting scintillation light in response to incident radiation; and a photo-detection substrate facing the scintillator panel and detecting the scintillation light. According to this constitution, the scintillator panel is provided. Accordingly, adhesion between the scintillator layer portion and the protective film is improved. As a result, it is possible to enhance the moisture resistance.

Advantageous Effects of Invention

According to the present invention, there are provided a scintillator panel in which adhesion of a protective film with respect to the scintillator panel can be improved, and a radiation detector.

Figure 3:
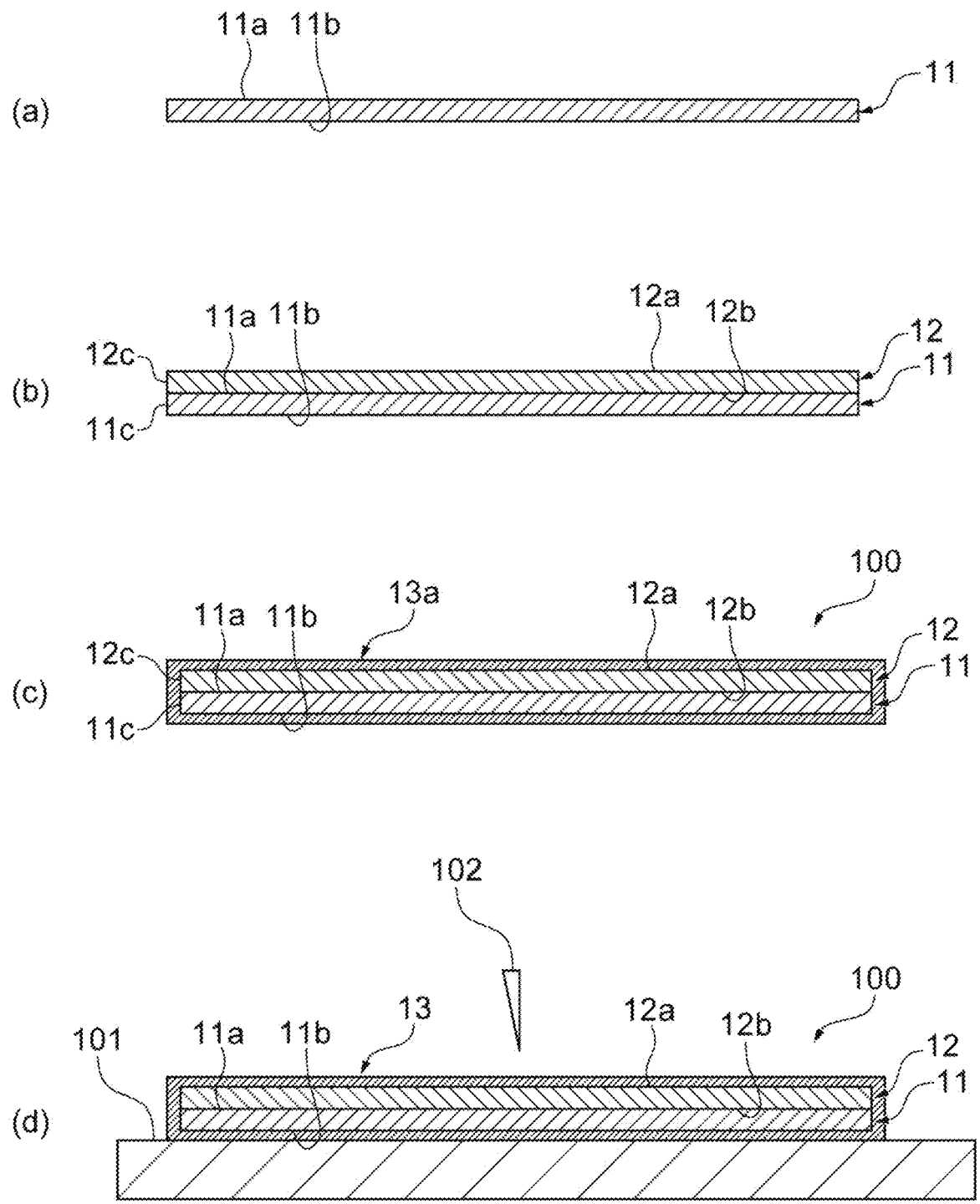

A part (a) of FIG. 3, a part (b) of FIG. 3, a part (c) of FIG. 3, and a part (d) of FIG. 3 are cross-sectional views illustrating main steps of manufacturing the radiation image sensor.

A part (a) of FIG. 4, a part (b) of FIG. 4, and a part (c) of FIG. 4 are cross-sectional views illustrating main steps of manufacturing the radiation image sensor.

Figure 5:
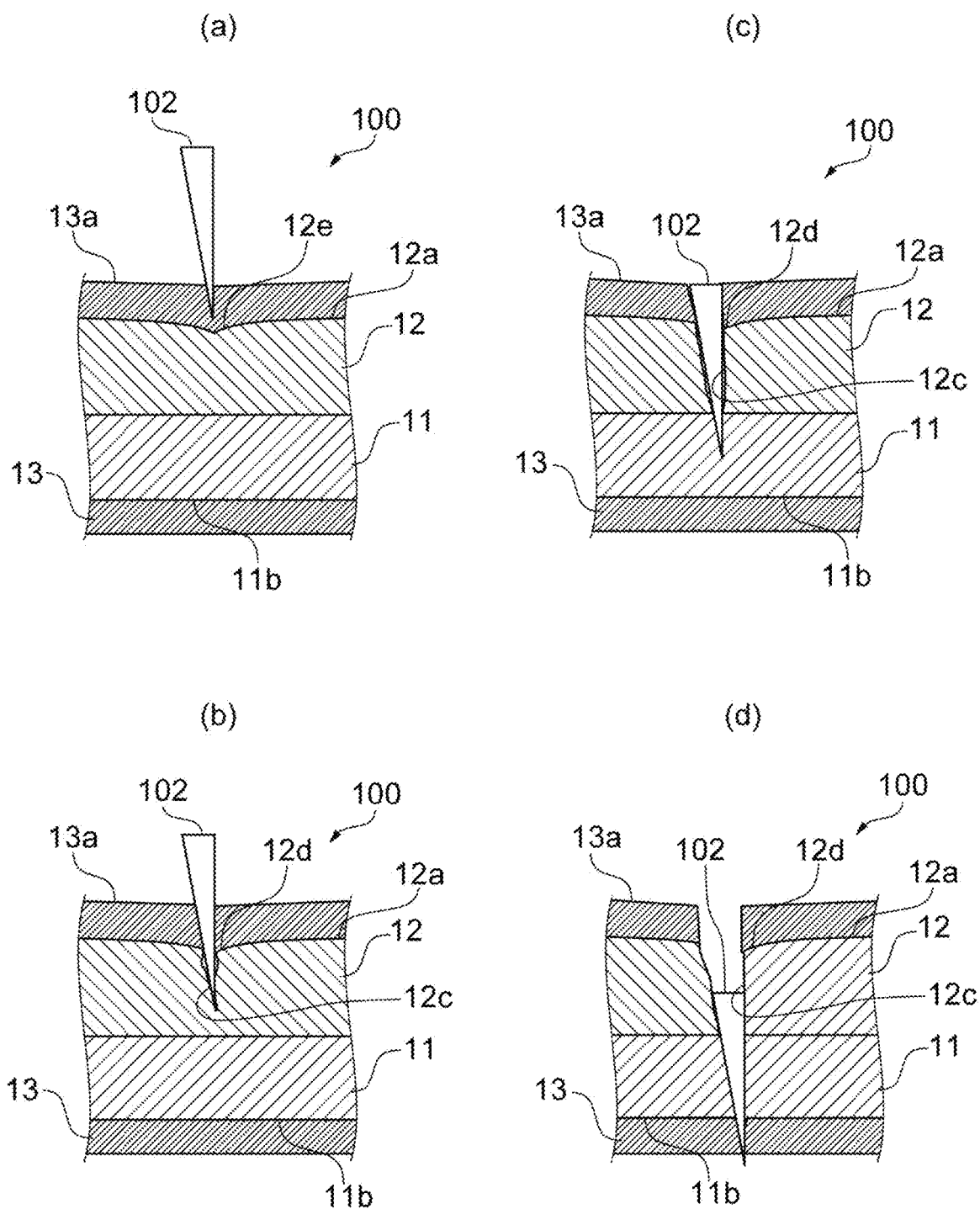

A part (a) of FIG. 5, a part (b) of FIG. 5, a part (c) of FIG. 5, and a part (d) of FIG. 5 are cross-sectional views schematically illustrating a situation in which a scintillator panel base body is cut.

Figure 6:
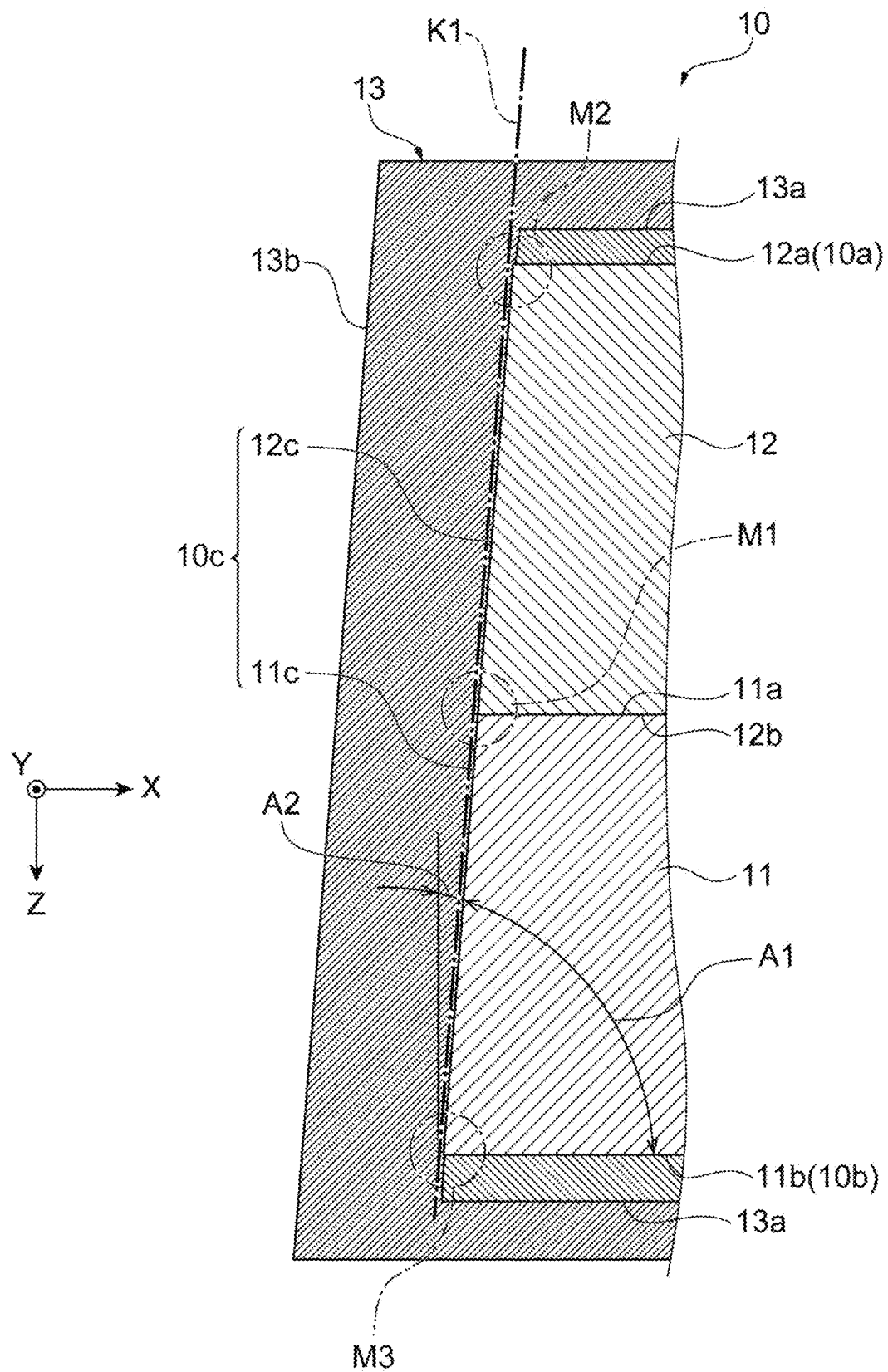

FIG. 6 is an enlarged cross-sectional view illustrating a scintillator panel side surface.

Figure 7:
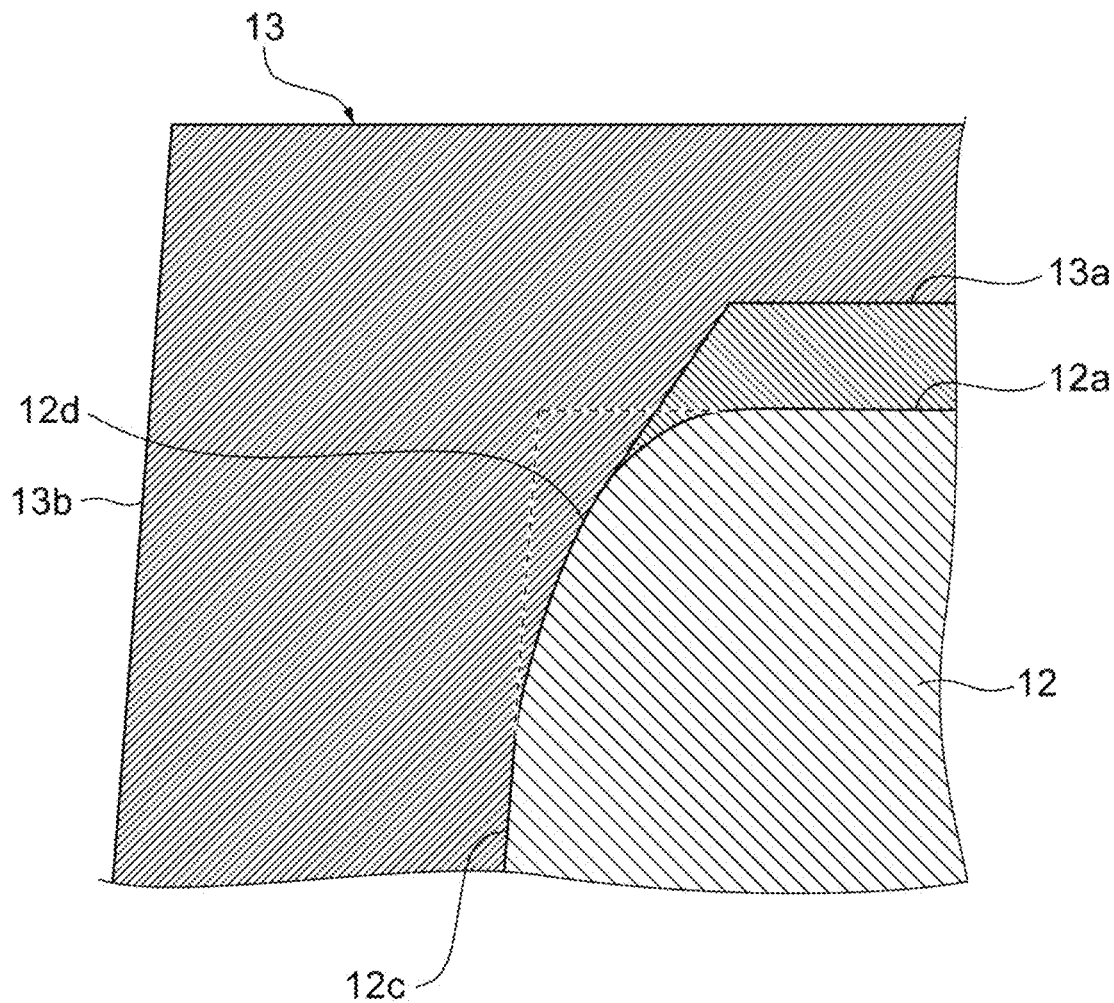

FIG. 7 is an enlarged cross-sectional view illustrating a main portion of a scintillator layer.

Figure 8:
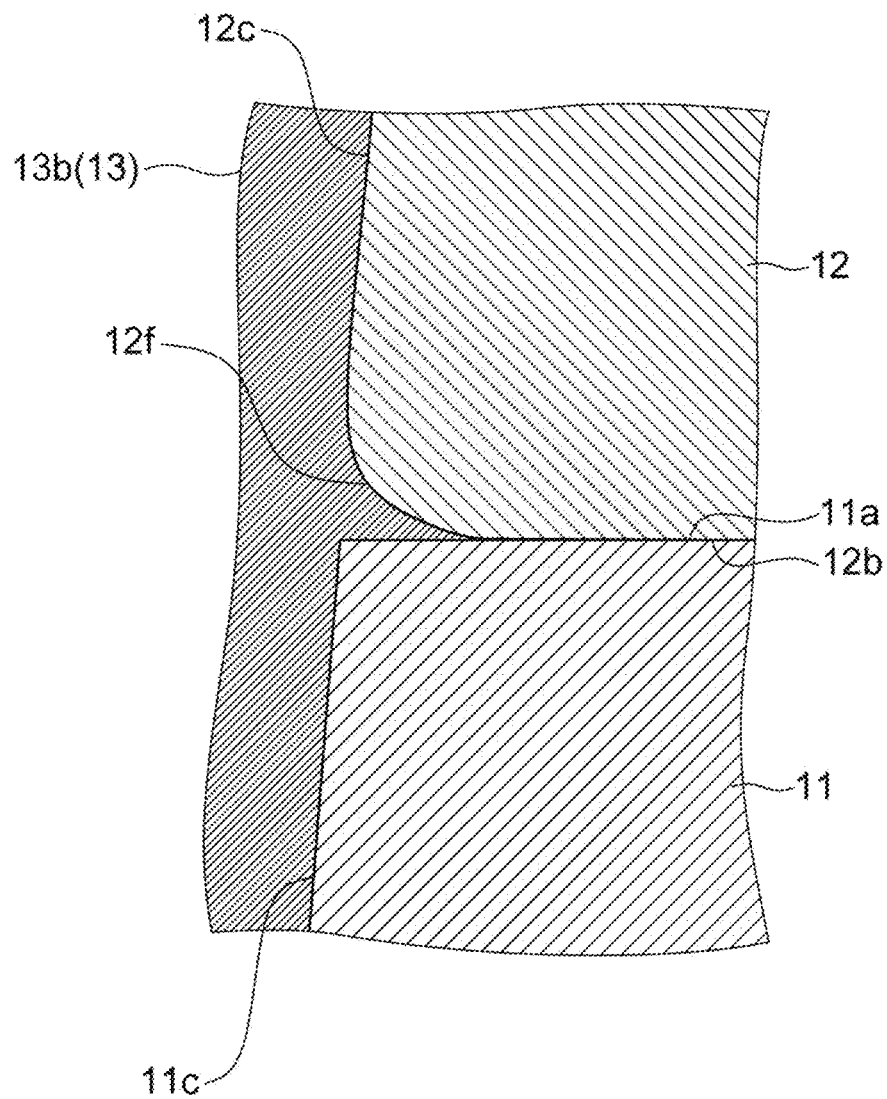

FIG. 8 is an enlarged cross-sectional view illustrating main portions of the scintillator layer and a substrate.

FIG. 9 is an enlarged cross-sectional view illustrating the main portion of the substrate.

Figure 10:
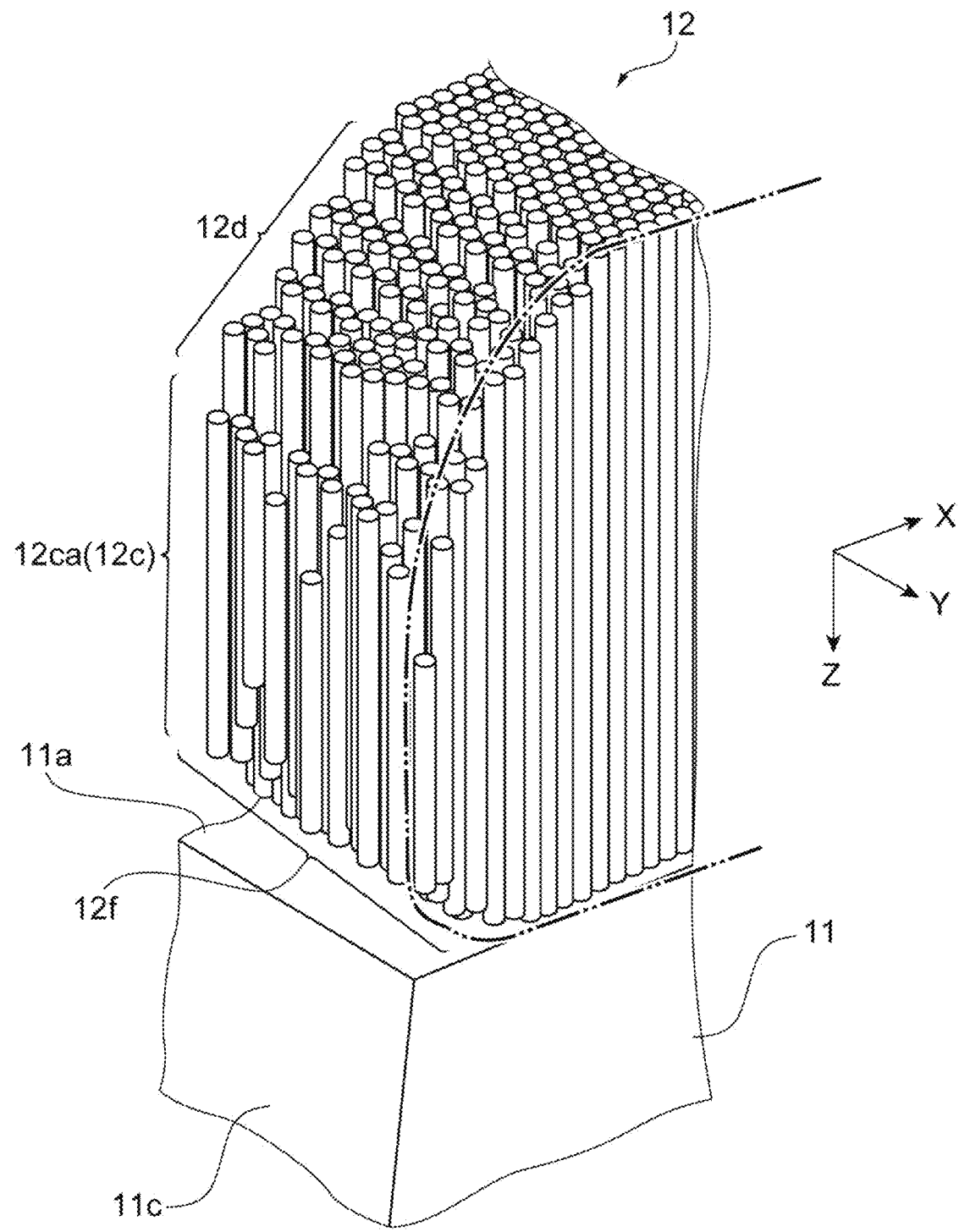

FIG. 10 is a perspective view schematically illustrating a situation of the scintillator layer including columnar crystals.

A part (a) of FIG. 11 is a cross-sectional view for describing an operation effect of a scintillator panel according to the embodiment, and a part (b) of FIG. 11 is a cross-sectional view for describing an operation effect of a scintillator panel according to a comparative example.

A part (a) of FIG. 12 is a cross-sectional view for describing another operation effect of the scintillator panel according to the embodiment, and a part (b) of FIG. 12 is a cross-sectional view for describing an operation effect of the scintillator panel according to another comparative example.

A part (a) of FIG. 13 and a part (b) of FIG. 13 are cross-sectional views illustrating a modification example of the radiation image sensor.

Figure 14:
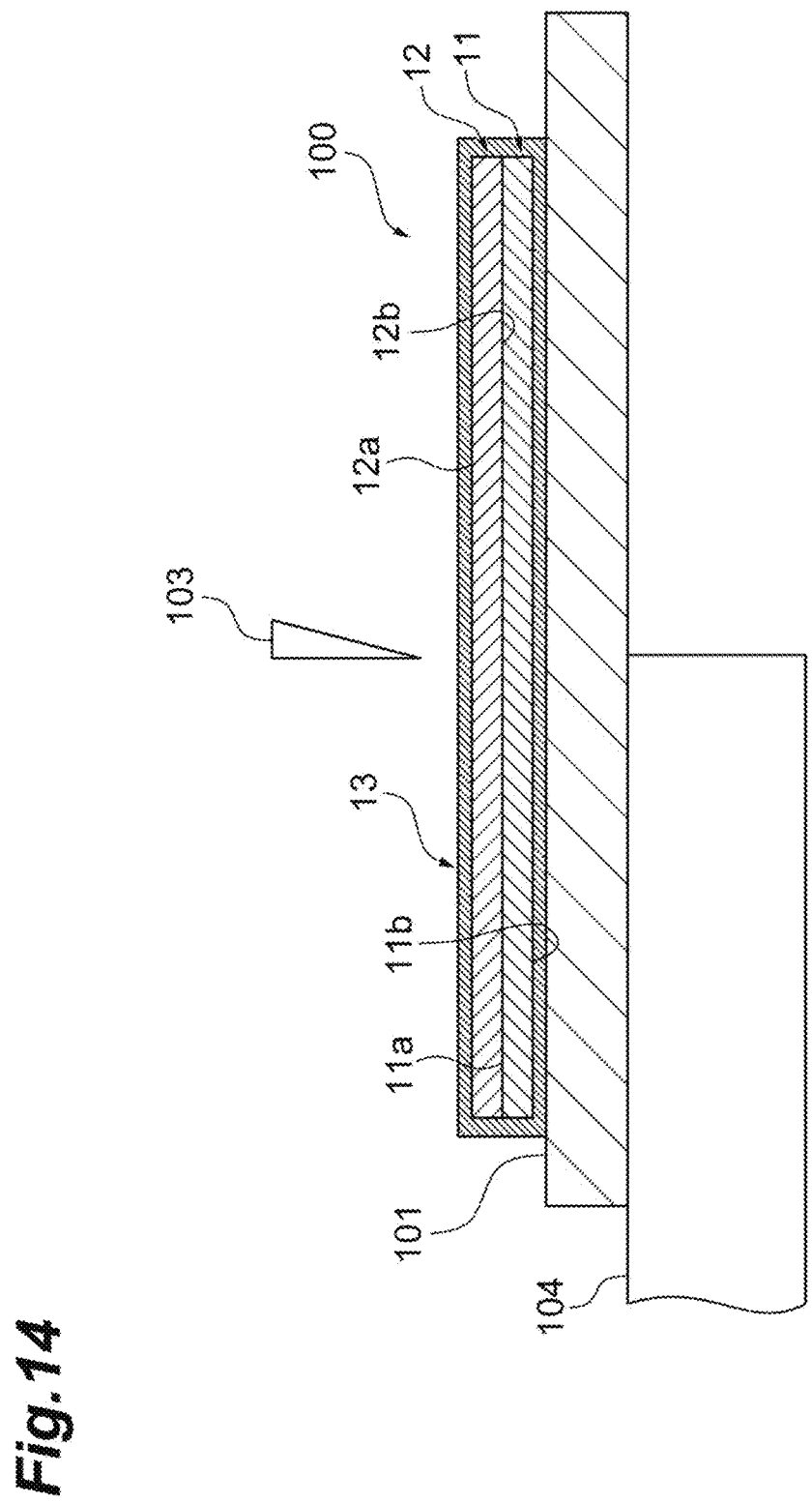

FIG. 14 is a view illustrating another form of cutting the scintillator panel base body.

A part (a) of FIG. 15, a part (b) of FIG. 15, and a part (c) of FIG. 15 are cross-sectional views schematically illustrating a situation in which the scintillator panel base body is cut.

DESCRIPTION OF EMBODIMENT

Hereinafter, with reference to the accompanying drawings, an embodiment of the present invention will be described in detail. In description of the drawings, the same reference signs will be applied to the same elements, and duplicate description will be omitted.

A scintillator panel according to the present embodiment converts radiation such as X-rays into scintillation light such as visible light. The scintillator panel is applied to a radiation image sensor used in a radiation camera, for example.

Figure 1:
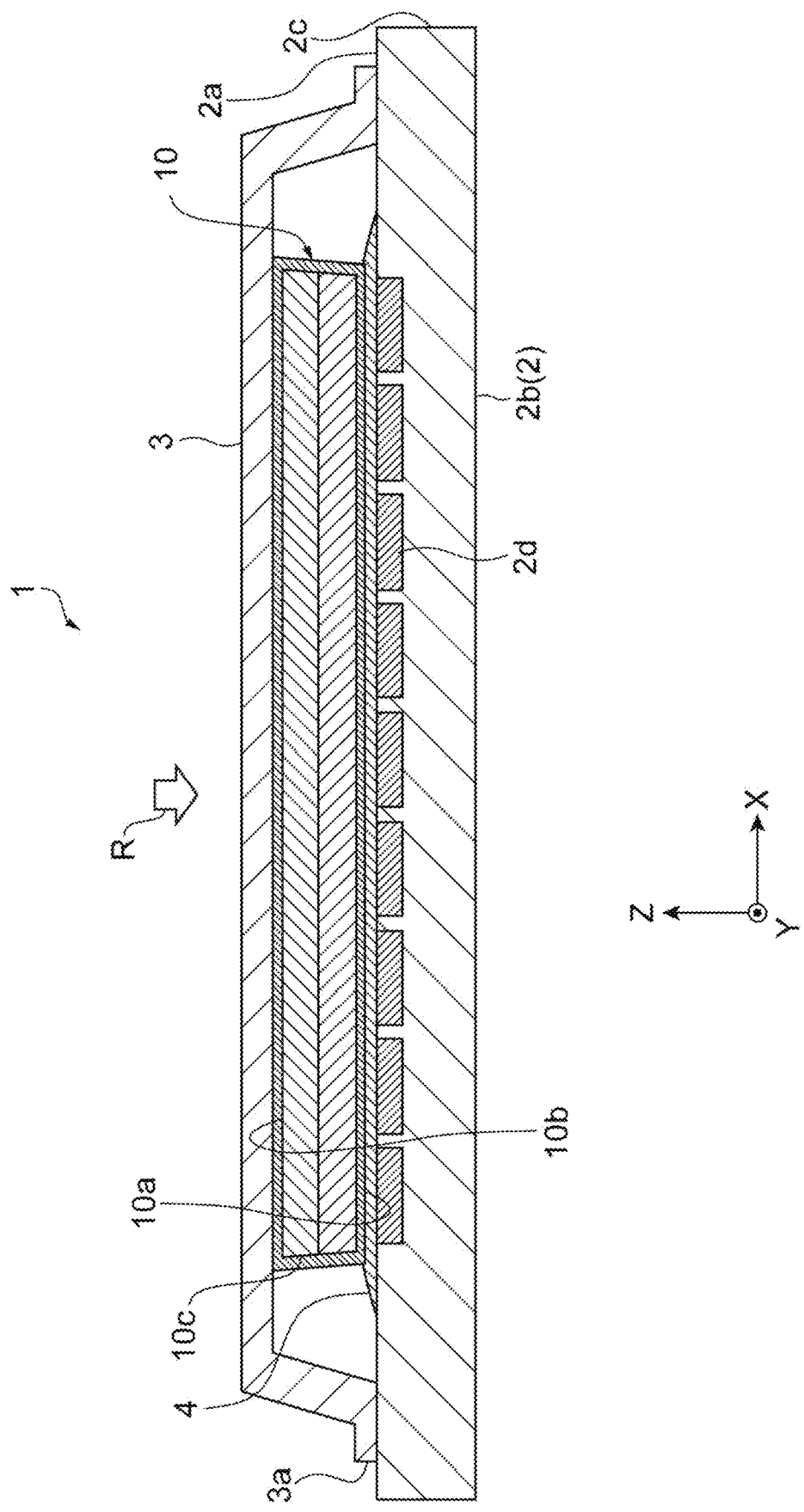
FIG. 1 is a cross-sectional view illustrating a radiation image sensor according to an embodiment.

As illustrated in FIG. 1, a radiation image sensor 1 serving as a radiation detector has a sensor substrate 2 (photo-detection substrate), a scintillator panel 10, and a moisture-proof sheet 3. These constituent elements are laminated in this order in a Z direction (first direction).

The sensor substrate 2 exhibits a rectangular shape in a plan view. The sensor substrate 2 has a main surface 2a, a rear surface 2b, and a side surface 2c. The sensor substrate 2 further has a plurality of photoelectric conversion elements 2d provided on the main surface 2a. The photoelectric conversion elements 2d are disposed in a two-dimensional manner along the main surface 2a.

The scintillator panel 10 exhibits a substantially rectangular shape in a plan view. The scintillator panel 10 has a panel main surface 10a, a panel rear surface 10b, and a panel side surface 10c. The scintillator panel 10 adheres to the main surface 2a such that a part on the main surface 2a of the sensor substrate 2 is covered. That is, the scintillator panel 10 is smaller than the sensor substrate 2. Specifically, the scintillator panel 10 is bonded to the main surface 2a with an adhesive 4 therebetween such that a region in which the photoelectric conversion elements 2d are disposed is covered. Details of the scintillator panel 10 will be described below.

The moisture-proof sheet 3 covers the entirety of the scintillator panel 10 and a part of the sensor substrate 2. Specifically, the moisture-proof sheet 3 covers the panel rear surface 10b and the panel side surface 10c of the scintillator panel 10. The moisture-proof sheet 3 covers a part of the main surface 2a of the sensor substrate 2, that is, a part surrounding the scintillator panel 10. A surrounding portion 3a of the moisture-proof sheet 3 adheres to the main surface 2a of the sensor substrate 2. Due to this constitution, air-tightness of an internal space covered by the moisture-proof sheet 3 is maintained. Accordingly, infiltration of moisture or the like into the moisture-proof sheet 3 from the outside is curbed.

The radiation image sensor 1 having the foregoing constitution receives radiation R from the moisture-proof sheet 3 side, for example. The scintillator panel 10 generates scintillation light in response to incidence of the radiation R. The sensor substrate 2 has the photoelectric conversion elements 2d disposed in a two-dimensional manner, and the photoelectric conversion elements 2d generate electrical signals in response to scintillation light. The electrical signals are drawn out through a predetermined electric circuit. Then, based on the electrical signals, a two-dimensional image indicating an incident position and energy of radiation is generated.

Figure 2:
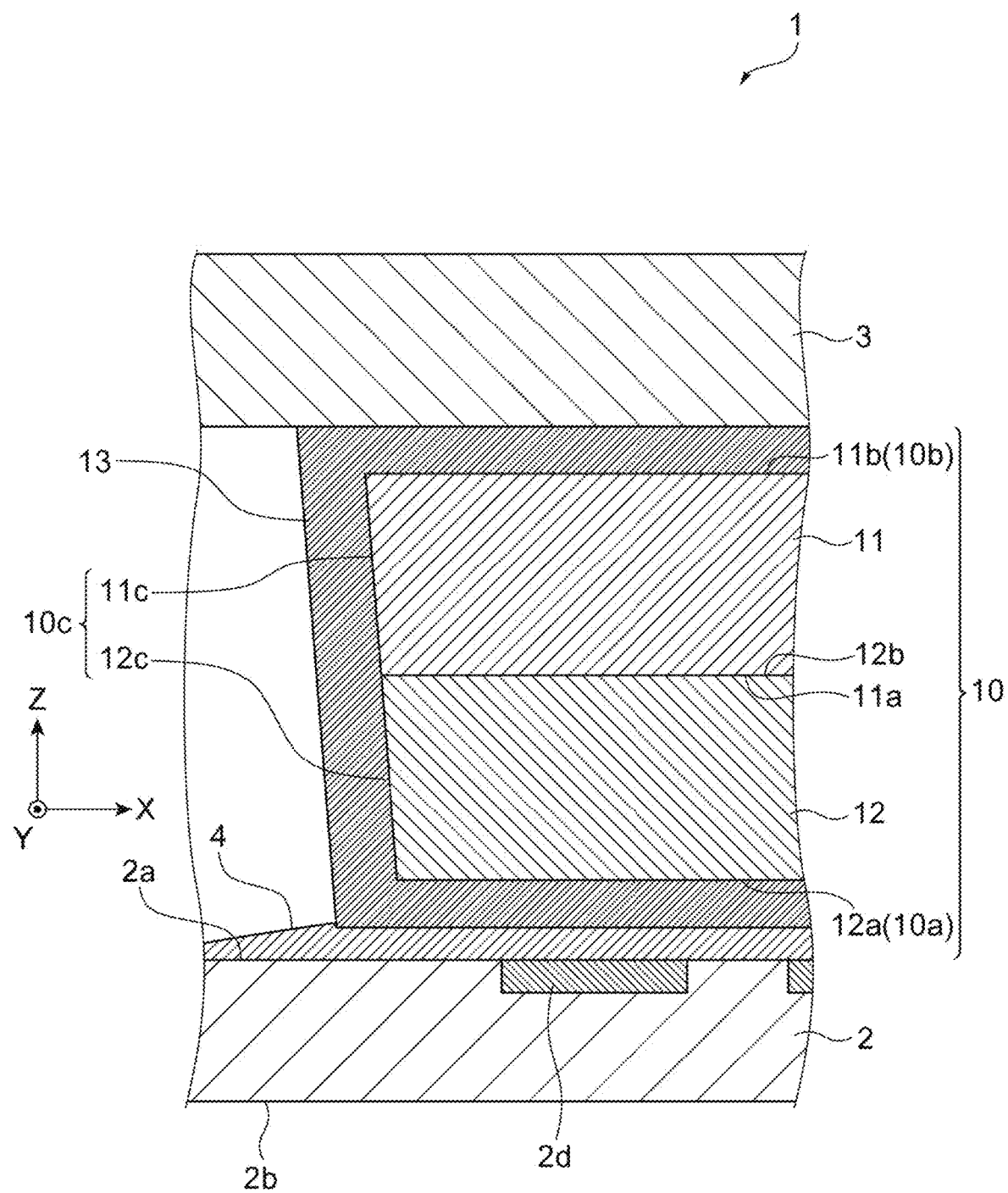
FIG. 2 is an enlarged cross-sectional view illustrating a main portion of the radiation image sensor illustrated in FIG. 1.

The scintillator panel 10 will be described in detail. FIG. 2 is an enlarged cross-sectional view illustrating a side portion of the scintillator panel 10. The scintillator panel 10 has a substrate 11 (substrate portion), a scintillator layer 12 (scintillator layer portion), and a protective film 13.

The substrate 11 is a resin plate member forming a base body of the scintillator panel 10. As an example, the substrate 11 is formed of polyethylene terephthalate (PET). When a PET substrate is used, flexibility can be applied to the scintillator panel 10. Moreover, work of bonding the scintillator panel 10 and the sensor substrate 2 becomes easy. In addition, it is possible to comparatively easily prepare an absorptive substrate or a reflective substrate with respect to scintillation light. As a result, the scintillator panel 10 having predetermined X-ray characteristics (brightness and resolution) can be formed. The substrate 11 has a substrate main surface 11a (first main surface), a substrate rear surface 11b (first rear surface), and a substrate side surface 11c (first side surface). The substrate main surface 11a and the substrate rear surface 11b are orthogonal to the Z direction on sides opposite to each other. The substrate side surface 11c extends such that the substrate main surface 11a and the substrate rear surface 11b are joined to each other. In other words, the substrate side surface 11c intersects an X direction and a Y direction intersecting the Z direction.

The scintillator layer 12 receives the radiation R and generates scintillation light. The scintillator layer 12 includes a plurality of columnar crystals having cesium iodide (CsI) as a main component such as CsI:Tl (refer to FIG. 10). For example, the CsI content of the scintillator layer 12 may be within a range of 90% to 100%. In other words, when the CsI content of the scintillator layer 12 is 90% or more, it may be stated that the scintillator layer 12 has CsI as a main component.

The scintillator layer 12 has a scintillator main surface 12a (second main surface), a scintillator rear surface 12b (second rear surface), and a scintillator side surface 12c (second side surface). The scintillator rear surface 12b is formed of a plurality of base portions on one end side of the columnar crystals. The scintillator main surface 12a is formed of a plurality of tip portions on the other end side of the columnar crystals. The scintillator main surface 12a and the scintillator rear surface 12b are orthogonal to the Z direction on sides opposite to each other. In addition, the scintillator rear surface 12b faces the substrate main surface 11a. That is, the scintillator layer 12 comes into direct contact with the substrate 11. In other words, no layer is interposed between the scintillator layer 12 and the substrate 11. The scintillator side surface 12c extends such that the scintillator main surface 12a and the scintillator rear surface 12b are joined to each other. In other words, the scintillator side surface 12c intersects the X direction and the Y direction intersecting the Z direction. The scintillator side surface 12c is substantially connected to the substrate side surface 11c. Such constitutions of the scintillator side surface 12c and the substrate side surface 11c are referred to as critical edges.

The protective film 13 covers the substrate 11 and the scintillator layer 12. The protective film 13 is a thin moisture-proof film. The protective film 13 is formed of parylene (polyparaxylene) or the like. Specifically, the protective film 13 is formed on the substrate rear surface 11b, the substrate side surface 11c, the scintillator main surface 12a, and the scintillator side surface 12c.

A method for manufacturing the radiation image sensor 1 will be described.

As illustrated in a part (a) of FIG. 3, the substrate 11 is prepared. Next, as illustrated in a part (b) of FIG. 3, the scintillator layer 12 is formed on the substrate main surface 11a. Specifically, a fluorescent body material (for example, CsI:Tl or CsBr:Eu) is subjected to vacuum vapor deposition on the substrate main surface 11a. As a result, columnar crystals grow on the substrate main surface 11a.

As illustrated in a part (c) of FIG. 3, a first film portion 13a is formed. As an example, the first film portion 13a is formed of parylene. The first film portion 13a is formed on the substrate rear surface 11b, the substrate side surface 11c, the scintillator main surface 12a, and the scintillator side surface 12c. The first film portion 13a enters gaps between the plurality of columnar crystals (refer to FIG. 10) constituting the scintillator layer 12. According to this constitution, the columnar crystals are protected by the first film portion 13a. As a result, damage to the columnar crystals in the next cutting step can be curbed. Through the foregoing steps, a scintillator panel base body 100 is obtained.

A plurality of scintillator panels 10 are cut out from the scintillator panel base body 100. That is, the scintillator panel base body 100 is cut. In this cutting, a cutting method such as shear blade (two blades on upper and lower sides, refer to FIGS. 14 and 15) type roller cutting, shearing, die-cutting, or push-cutting (upper single-blade) type (refer to FIG. 5) may be employed. As illustrated in a part (d) of FIG. 3, the scintillator panel base body 100 is disposed on a work table 101. At this time, the substrate rear surface 11b faces the work table 101. According to this disposition, a cutting tool 102 is inserted from the scintillator layer 12 side.

As illustrated in a part (a) of FIG. 4, a second film portion 13b is formed. Similar to the first film portion 13a, the second film portion 13b may also employ parylene. The panel side surface 10c includes the substrate side surface 11c and the scintillator side surface 12c. Here, the second film portion 13b is formed such that at least side surfaces thereof are covered. The second film portion 13b may cover the first film portion 13a on the substrate rear surface 11b and the first film portion 13a on the scintillator main surface 12a. The first film portion 13a and the second film portion 13b constitute the protective film 13.

As illustrated in a part (b) of FIG. 4, the scintillator panel 10 is stuck on the sensor substrate 2 which has been prepared in advance. First, the sensor substrate 2 is coated with the adhesive 4. Next, the scintillator panel 10 is placed on the adhesive 4. At this time, the panel main surface 10a faces the main surface 2a of the sensor substrate 2. Then, since the substrate side surface 11e and the scintillator side surface 12c are flush with each other, the adhesive 4 can flow favorably on the side surfaces thereof. Accordingly, it is possible to avoid a state where air bubbles stay in the adhesive 4. Then, the adhesive 4 is cured through heating, using irradiation of ultraviolet rays, or the like. Then, as illustrated in a part (c) of FIG. 4, the moisture-proof sheet 3 is attached. Through the foregoing steps, the radiation image sensor 1 is obtained.

As described above, the method for manufacturing the radiation image sensor 1 and the scintillator panel 10 includes a step of cutting the scintillator panel base body 100. Here, cutting of the scintillator panel base body 100, and a cut surface (that is, the panel side surface 10c) will be described in detail with reference to FIGS. 5 to 10. In FIGS. 6 to 10, for the convenience of description, the vertical direction is upside down with respect to the radiation image sensor 1 illustrated in FIGS. 1 and 2.

When the scintillator panel 10 is cut by inserting the cutting tool 102 from a side of the scintillator layer 12, a cut surface (panel side surface 10c) as illustrated in FIG. 6 is formed. The panel side surface 10c includes the substrate side surface 11c and the scintillator side surface 12c.

As already described above, the scintillator side surface 12c is substantially connected to the substrate side surface 11c. That is, the scintillator side surface 12c is substantially flush with the substrate side surface 11c. Here, the expression "flush with each other" denotes that when the substrate side surface 11c and the scintillator side surface 12c are viewed in a macroscopic manner, each of the surfaces is included in the same virtual plane K1. As will be described below, the substrate side surface 11c and the scintillator side surface 12c have minute uneven structures such as an undercut, a coarse surface, or burrs when viewed in a microscopic manner. However, when they are defined to be "flush with each other", the uneven structures are disregarded. In addition, the expression "substantially flush with each other" means that the substrate side surface 11c and the scintillator side surface 12c do not have to be completely included in the same plane. For example, a predetermined width need only be defined based on the virtual plane K1, such that the substrate side surface 11c and the scintillator side surface 12c are settled on an inner side of the width. In other words, for example, as illustrated in a part (b) of FIG. 11 and a part (b) of FIG. 12, the expression "substantially flush with each other" means that none of the substrate side surface 11c and the scintillator side surface 12c is in a form of further protruding than the other.

When the substrate 11 is viewed in the Y direction, the panel side surface 10c is not perpendicular. In other words, the panel side surface 10c is tilted with respect to the Z direction. More specifically, the substrate side surface 11c constituting the panel side surface 10c is tilted with respect to the Z direction.

More specifically, an angle A1 between the substrate rear surface 11b and the substrate side surface 11c is smaller than 90 degrees. In other words, the angle A1 is 82 degrees or larger. In addition, the angle A1 is 88 degrees or smaller. As an example, the angle A1 is approximately 85 degrees. An angle A2 between the Z direction and the substrate side surface lie is within a range larger than zero degrees to 8 degrees. In addition, the angle A2 is 2 degrees or larger. The substrate side surface 11c and the scintillator side surface 12c defined by the angles A1 and A2 are inclined toward the centers of the substrate 11 and the scintillator layer 12. When the angles A1 and A2 are defined, similar to the expression "flush with each other" described above, uneven structures formed on the substrate side surface 11c are disregarded. That is, when the angles A1 and A2 are defined, the substrate side surface 11c may be replaced as the virtual plane K1 described above. In this case, the angle A1 is an angle between the substrate rear surface 11b and the virtual plane K1 of which minute uneven structures are disregarded.

FIG. 7 illustrates a cross section of a corner portion of the scintillator main surface 12a and the scintillator side surface 12c of the scintillator layer 12. That is, FIG. 7 is an enlarged view of a part M2 in FIG. 6. A region having a curved surface shape referred to as an undercut 12d (undercut portion) is formed in the corner portion of the scintillator layer 12.

When the scintillator panel base body 100 is cut, the cutting tool 102 is first pushed against the first film portion 13a (refer to a part (a) of FIG. 5). At this time, the cutting tool 102 is not in contact with the scintillator layer 12. Then, if the cutting tool 102 is further thrust, the cutting tool 102 cuts the first film portion 13a while slightly squashing the first film portion 13a. Internal stress due to this squashing also arrives at a part 12e of the scintillator layer 12 where the cutting tool 102 has not arrived. Consequently, until the cutting tool 102 arrives at the scintillator layer 12, columnar crystals forming the part 12e included in the scintillator main surface 12a are slightly destroyed and become deficient due to the internal stress. This part in which columnar crystals become deficient forms the undercut 12d (refer to FIG. 10).

When the cutting tool 102 arrives at the scintillator layer 12 (refer to a part (b) of FIG. 5), the scintillator layer 12 is cut by the sharp cutting tool 102. The scintillator layer 12 includes a plurality of columnar crystals extending in the Z direction. As a result, the cutting tool 102 moves downward while breaking a part of the columnar crystals. This breakage of the columnar crystals may occur irregularly. Accordingly, when a broken surface (that is, the scintillator side surface 12c) of the scintillator layer 12 is viewed in a microscopic manner, the broken surface is formed of a plurality of columnar crystals which are irregularly broken. Accordingly, the scintillator side surface 12c becomes a coarse surface 12ca in a microscopic manner (refer to FIG. 10). For example, the expression "a coarse surface" stated herein indicates a surface having more significant unevenness than a surface which has no lack of columnar crystals and in which columnar crystals are regularly arranged.

As illustrated in FIG. 8, in cutting performed by the cutting tool 102, when the thickness of the scintillator layer 12 becomes comparatively large (for example, 200 μm or larger), a notch 12f (notch portion) may be generated on the scintillator rear surface 12b of the scintillator layer 12. This notch 12f is formed due to a part in which the base portion of the columnar crystals becomes deficient (refer to FIG. 10).

The second film portion 13b provided after cutting enters the undercut 12d, the coarse surface 12ca, and the notch 12f. Specifically, the second film portion 13b enters minute gaps generated due to deficiency of columnar crystals. Therefore, according to this constitution, adhesion of the second film portion 13b with respect to the scintillator side surface 12c is improved.

The cutting tool 102 cuts the substrate 11 while moving further downward. In an initial stage (refer to a part (c) of FIG. 5) of the cutting process of the substrate 11, the thickness of the substrate 11 is comparatively large. Accordingly, the substrate 11 is not bent due to a force of pressing the cutting tool 102 downward, and the substrate 11 is cut by the cutting tool 102. A surface formed in this process is a shear surface which is comparatively smooth. In a later stage (refer to a part (d) of FIG. 5) of the cutting process, the thickness of the substrate 11 becomes comparatively small. Accordingly, the substrate 11 cannot withstand the force of pressing the cutting tool 102 downward. As a result, the substrate 11 is divided due to the force. The state (refer to FIG. 9, a part M3 in FIG. 6) of the front surface of a surface formed in this process is a coarse surface 11d (broken surface) which is comparatively coarse. A burr 11e is formed at a lower end of the coarse surface 11d. Accordingly, on the substrate side surface 11c, a smooth surface and a coarse surface are present side by side along the proceeding direction of the cutting tool 102. That is, a region far from the scintillator layer 12 on the substrate side surface 11c has coarser surface than a region closer to the scintillator layer 12. The coarse surface 12ca on the scintillator side surface 12c is not connected to the coarse surface 11d on the substrate side surface 11c. That is, a comparatively smooth part of the substrate side surface 11c is present between the coarse surface 12ca and the coarse surface 11d. In addition, for example, the burr 11e is a sharp part further protruding than the substrate rear surface 11b on the substrate side surface 11c.

Hereinafter, operation effects of the scintillator panel 10 and the radiation image sensor 1 according to the present embodiment will be described.

The scintillator panel 10 includes the substrate 11 and the scintillator layer 12. The substrate side surface 11c of the substrate 11 partially has a coarsened region (coarse surface 11d). According to this coarse surface 11d, the contact area between the substrate 11 and the protective film 13 increases. In addition, the scintillator side surface 12c of the scintillator layer 12 has the coarse surface 12ca which is a coarsened region including uneven structures. According to this coarse surface 12ca, the contact area between the scintillator layer 12 and the protective film 13 increases. Adhesion of the protective film 13 is enhanced as the contact area increases. Accordingly, in the scintillator panel 10, adhesion between the substrate 11 and the protective film 13 and adhesion between the scintillator layer 12 and the protective film 13 can be improved.

Uneven structures of the coarse surface 12ca are formed when the columnar crystals become partially deficient. The scintillator side surface 12c having such a constitution is obtained by cutting a laminated structure having the scintillator layer 12 and the substrate 11. Accordingly, the coarse surface 12ca having uneven structures can be formed easily.

The substrate side surface 11c includes the burr lie formed in a corner portion between the substrate rear surface 11b and the substrate side surface 11c. According to this constitution, the contact area between the substrate 11 and the protective film 13 increases. Accordingly, in the scintillator panel 10, adhesion between the substrate 11 and the protective film 13 can be improved.

The scintillator layer 12 has the notch 12f formed in a corner portion between the scintillator rear surface 12b and the scintillator side surface 12c. The notch 12f is filled with the protective film 13. According to this constitution, the contact area between the scintillator layer 12 and the protective film 13 further increases. Furthermore, the contact area between the substrate 11 and the protective film 13 further increases as well. Accordingly, in the scintillator panel 10, adhesion with respect to the protective film 13 can be further improved.

The scintillator layer 12 has the undercut 12d formed in a corner portion between the scintillator main surface 12a and the scintillator side surface 12c. The undercut 12d is filled with the protective film 13. According to this constitution, the contact area between the scintillator layer 12 and the protective film 13 still further increases. Accordingly, in the scintillator panel 10, adhesion with respect to the protective film 13 can be still further improved.

Since the radiation image sensor 1 includes the scintillator panel 10, adhesion between the scintillator layer 12 and the protective film 13 is improved, and the moisture resistance can be enhanced.

The scintillator panel 10 and the radiation image sensor 1 according to the present embodiment can also exhibit operation effects as follows.

In the scintillator panel 10, the angle A1 between the substrate rear surface 11b and the substrate side surface 11c of the substrate 11 is smaller than 90 degrees. Such a shape is formed by putting the cutting tool 102 from the scintillator layer 12 side into a laminated structure in which the substrate 11 and the scintillator layer 12 are laminated. Accordingly, cutting can be utilized in molding of a scintillator panel. As a result, the scintillator panel 10 can be molded to have an arbitrary shape and an arbitrary size.

The substrate side surface 11c of the substrate 11 and the scintillator side surface 12c of the scintillator layer 12 are flush with each other, and the angle A1 between the substrate rear surface 11b and the substrate side surface 11c of the substrate 11 is smaller than 90 degrees. The substrate side surface 11c of the substrate 11 further protrudes outward than the scintillator side surface 12c of the scintillator layer 12. In other words, the substrate 11 has a part present on a side outward from the scintillator layer 12. According to this constitution, the scintillator side surface 12c of the scintillator layer 12 is protected by the substrate side surface 11c of the substrate 11.

A part (a) of FIG. 11 illustrates the scintillator panel 10 according to the embodiment, and the part (b) of FIG. 11 illustrates a scintillator panel 200 according to a comparative example. According to the part (b) of FIG. 11, a part 202d on a side surface 202c of a scintillator layer 202 further protrudes than a substrate side surface 201c of a substrate 201. According to such a constitution, for example, when the scintillator panel 200 approaches relatively closer to a flat plate 210, a protective film 213 on the part 202d of the scintillator layer 202 abuts first. Since the internal stress due to the abutment acts on the protruding part 202d of the scintillator layer 202, the scintillator layer 202 is likely to be damaged. On the other hand, according to the part (a) of FIG. 11, when the scintillator panel 10 approaches relatively closer to the flat plate 210, the protective film 13 on the substrate side surface 11c of the substrate 11 abuts first. Accordingly, the protective film 13 on the substrate side surface 11c abuts earlier than the protective film 13 on the scintillator side surface 12c. As a result, damage to the scintillator layer 12 due to a collision can be reduced. Accordingly, in the case of the scintillator panel 10 according to the embodiment, damage due to an impact to the scintillator side surface 12c at the time of handling is curbed.

The substrate side surface 11c of the substrate 11 and the scintillator side surface 12c of the scintillator layer 12 are flush with each other. Accordingly, when the scintillator panel 10 is bonded to another component using the adhesive 4, the adhesive 4 flows favorably. As a result, occurrence of accumulation of air bubbles is curbed. Therefore, according to the scintillator panel 10, bonding work with respect to a photo-detection substrate can be easily performed.

A part (a) of FIG. 12 illustrates the scintillator panel 10 according to the embodiment, and the part (b) of FIG. 12 illustrates a scintillator panel 300 according to another comparative example. According to the part (b) of FIG. 12, a side surface 301c of a scintillator layer 301 and a side surface 302c of a substrate 302 are not flush with each other. In this case, a region surrounded by a sensor substrate 310, the scintillator layer 301, and the substrate 302 is formed. Then, when the scintillator panel 300 adheres to the sensor substrate 310, an adhesive 304 tends to stay in the region. As a result, air bubbles 320 included in the adhesive 304 are likely to stay in a corner portion between the scintillator layer 301 and the substrate 302. In a case where such staying is expected, execution of processing such as degassing is examined. On the other hand, such a region of the scintillator panel 300 in the comparative example is not formed in the scintillator panel 10 illustrated in the part (a) of FIG. 12. That is, the adhesive 4 is not retained in a predetermined region. Accordingly, adhesive workability between the scintillator panel 10 and the sensor substrate 2 can be improved.

According to the radiation image sensor 1 including the scintillator panel 10, work of sticking the scintillator panel 10 on the sensor substrate 2 can be easily performed. Accordingly, the radiation image sensor 1 can be easily assembled.

Hereinabove, an embodiment of the present invention has been described. However, the present invention is not limited to the foregoing embodiment and can be performed in various forms.

For example, in the scintillator panel 10 according to the forgoing embodiment, the scintillator layer 12 is formed on the substrate 11. That is, the scintillator rear surface 12b comes into direct contact with the substrate main surface 11a. The scintillator panel 10 is not limited to such a constitution.

As illustrated in a part (a) of FIG. 13, in addition to a substrate 11A and the scintillator layer 12, a scintillator panel 10A included in a radiation image sensor 1A may further include an additional layer having additional function. Examples of an additional layer include a barrier layer 16 formed between the substrate 11A and the scintillator layer 12. According to this constitution, the scintillator panel 10A has a laminated structure in which the substrate 11A, the barrier layer 16, and the scintillator layer 12 are laminated in this order. That is, the scintillator layer 12 is formed on the substrate main surface 11a with the barrier layer 16 therebetween.

The barrier layer 16 is a layer, for example, having thallium iodide (TlI) as a main component. For example, the TlI content of the barrier layer 16 may be within a range of 90% to 100%. In other words, when the TlI content of the barrier layer 16 is 90% or more, it may be stated that the barrier layer 16 has TlI as a main component. The barrier layer 16 has properties such that moisture is unlikely to pass therethrough. For example, when moisture has percolated from the substrate 11A side, movement of the moisture to the scintillator layer 12 is hindered by the barrier layer 16. Therefore, according to the scintillator panel 10A having the barrier layer 16, deliquescence of columnar crystals constituting the scintillator layer 12 due to moisture can be curbed.

Such a constitution is particularly effective in a case where the substrate 11A has an organic layer which moisture easily penetrates. A substrate having an organic layer stated herein may be the substrate 11A constituted of a base body 11m made of a material (metal, carbon, glass, or the like) different from an organic material, and an organic layer 11r made of an organic material (xylylene resin, acrylic resin, silicone resin, or the like). In addition, as illustrated in a part (b) of FIG. 13, a substrate having an organic layer may be a substrate 11B constituted of a base body 11s made of an organic material (polyethylene terephthalate, polyethylene naphthalate, polyester, polyetheretherketone, polyimide, or the like).

A predetermined optical function may be applied to a substrate of the scintillator panel 10. Specifically, functions such as light absorption properties, light transmission properties, or light reflection properties may be selectively applied to a substrate. For example, when light reflection properties are applied to a substrate, titanium dioxide, alumina, yttrium oxide, or zirconium oxide (reflective pigment) is added to PET which is a main material of the substrate. In addition, as another example of a case where light reflection properties are applied to a substrate, a light reflective layer including the reflective pigment described above and a binder resin may be formed on a base body having PET as a main material.

As illustrated in FIG. 14, in cutting of the scintillator panel base body 100, shear blade cutting (two blades on upper and lower sides) type as described above may be employed. This type utilizes an upper blade 103 and a lower blade 104. As illustrated in the part (a), the part (b), and the part (c) of FIG. 15, first, the scintillator panel base body 100 is disposed on the lower blade 104. Strictly speaking, a blade portion of the lower blade 104 is a corner portion. The scintillator panel base body 100 is disposed such that the corner portion is covered (refer to the part (a) of FIG. 15). Next, the upper blade 103 is input from the scintillator layer 12 side (refer to the parts (a) and (b) of FIG. 15). Then, when the upper blade 103 arrives at the corner portion of the lower blade 104, the scintillator panel base body 100 is cut (refer to the part (c) of FIG. 15).

REFERENCE SIGNS LIST

1 Radiation image sensor
2 Sensor substrate (photo-detection substrate)
2a Main surface
2b Rear surface
2c Side surface
2d Photoelectric conversion element
3 Moisture-proof sheet
3a Surrounding portion
4 Adhesive
10, 10A Scintillator panel
10a Panel main surface
10b Panel rear surface
10c Panel side surface
11, 11A Substrate (substrate portion)
11a Substrate main surface (first main surface)
11b Substrate rear surface (first rear surface)
11c Substrate side surface (first side surface)
11d Coarse surface
11e Burr
11s Base body
11r Organic layer
11B Substrate
11m Base body
12 Scintillator layer (scintillator layer portion)
12a Scintillator main surface (second main surface)
12b Scintillator rear surface (second rear surface)
12c Scintillator side surface (second side surface)
12ca Coarse surface
12d Undercut (undercut portion)
12f Notch (notch portion)
13 Protective film
13a First film portion
13b Second film portion
16 Barrier layer
100 Scintillator panel base body
101 Work table
102 Cutting tool
A1, A2 Angle
K1 Virtual plane
R Radiation

The invention claimed is:
1. A scintillator panel comprising:
a substrate portion having a first main surface and a first rear surface intersecting a first direction on sides opposite to each other, and a first side surface extending such that the first main surface and the first rear surface are joined to each other;
a scintillator layer portion having a second rear surface formed of a plurality of columnar crystals extending in the first direction and formed to include a base portion being on one end side of the columnar crystals and facing the first main surface, a second main surface formed to include a tip portion on the other end side of the columnar crystals, and a second side surface extending such that the second main surface and the second rear surface are joined to each other; and
a protective film covering the first rear surface and the first side surface of the substrate portion, and the second main surface and the second side surface of the scintillator layer portion,
wherein the first side surface partially has a coarsened region,
wherein the second side surface has a coarsened region including an uneven structure,
wherein the protective film closely adheres to the second side surface such that the coarsened regions of the first side surface and the second side surface are covered, and wherein the first side surface includes a burr formed in a corner portion between the first rear surface and the first side surface.

2. The scintillator panel according to claim 1, wherein the uneven structure included in the coarsened region is formed when the columnar crystals become partially deficient.

3. The scintillator panel according to claim 1, wherein the second rear surface of the scintillator layer portion comes into contact with the first main surface of the substrate portion.

4. The scintillator panel according to claim 1, further comprising:
a barrier layer formed to come into contact with each of the first main surface in the substrate portion and the second rear surface in the scintillator layer portion,
wherein the barrier layer is formed of thallium iodide, and
wherein the scintillator layer portion is formed of a material having cesium iodide as a main component.

5. A radiation detector comprising:
a scintillator panel according to claim 1 emitting scintillation light in response to incident radiation; and
a photo-detection substrate facing the scintillator panel and detecting the scintillation light.

6. A scintillator panel comprising:
a substrate portion having a first main surface and a first rear surface intersecting a first direction on sides opposite to each other, and a first side surface extending such that the first main surface and the first rear surface are joined to each other;
a scintillator layer portion having a second rear surface formed of a plurality of columnar crystals extending in the first direction and formed to include a base portion being on one end side of the columnar crystals and facing the first main surface, a second main surface formed to include a tip portion on the other end side of the columnar crystals, and a second side surface extending such that the second main surface and the second rear surface are joined to each other; and
a protective film covering the first rear surface and the first side surface of the substrate portion, and the second main surface and the second side surface of the scintillator layer portion,
wherein the first side surface partially has a coarsened region,
wherein the second side surface has a coarsened region including an uneven structure,
wherein the protective film closely adheres to the second side surface such that the coarsened regions of the first side surface and the second side surface are covered,
wherein the scintillator layer portion has a notch portion formed in a corner portion between the second rear surface and the second side surface, and
wherein the notch portion is filled with the protective film.

7. The scintillator panel according to claim 6, wherein the uneven structure included in the coarsened region is formed when the columnar crystals become partially deficient.

8. The scintillator panel according to claim 6 wherein the second rear surface of the scintillator layer portion comes into contact with the first main surface of the substrate portion.

9. The scintillator panel according to claim 6, further comprising:
a barrier layer formed to come into contact with each of the first main surface in the substrate portion and the second rear surface in the scintillator layer portion,
wherein the barrier layer is formed of thallium iodide, and
wherein the scintillator layer portion is formed of a material having cesium iodide as a main component.

10. A radiation detector comprising:
a scintillator panel according to claim 6 emitting scintillation light in response to incident radiation; and
a photo-detection substrate facing the scintillator panel and detecting the scintillation light.

11. A scintillator panel comprising:
a substrate portion having a first main surface and a first rear surface intersecting a first direction on sides opposite to each other, and a first side surface extending such that the first main surface and the first rear surface are joined to each other;
a scintillator layer portion having a second rear surface formed of a plurality of columnar crystals extending in the first direction and formed to include a base portion being on one end side of the columnar crystals and facing the first main surface, a second main surface formed to include a tip portion on the other end side of the columnar crystals, and a second side surface extending such that the second main surface and the second rear surface are joined to each other; and
a protective film covering the first rear surface and the first side surface of the substrate portion, and the second main surface and the second side surface of the scintillator layer portion,
wherein the first side surface partially has a coarsened region,
wherein the second side surface has a coarsened region including an uneven structure,
wherein the protective film closely adheres to the second side surface such that the coarsened regions of the first side surface and the second side surface are covered,
wherein the scintillator layer portion has an undercut portion formed in a corner portion between the second main surface and the second side surface, and
wherein the undercut portion is filled with the protective film.

12. The scintillator panel according to claim 11, wherein the uneven structure included in the coarsened region is formed when the columnar crystals become partially deficient.

13. The scintillator panel according to claim 11, wherein the second rear surface of the scintillator layer portion comes into contact with the first main surface of the substrate portion.

14. The scintillator panel according to claim 11, further comprising:
a barrier layer formed to come into contact with each of the first main surface in the substrate portion and the second rear surface in the scintillator layer portion,
wherein the barrier layer is formed of thallium iodide, and
wherein the scintillator layer portion is formed of a material having cesium iodide as a main component.

15. A radiation detector comprising:
a scintillator panel according to claim 11 emitting scintillation light in response to incident radiation; and
a photo-detection substrate facing the scintillator panel and detecting the scintillation light.

* * * * *